United States Patent [19]

Friis

[11] Patent Number: 4,776,221
[45] Date of Patent: Oct. 11, 1988

[54] METHOD AND DEVICE FOR CABLE INSTALLATION

[75] Inventor: Brigt L. Friis, Oslo, Norway

[73] Assignee: Alcatel N.V., Amsterdam, Netherlands

[21] Appl. No.: 946,413

[22] Filed: Dec. 24, 1986

[30] Foreign Application Priority Data

Mar. 10, 1986 [NO] Norway .................................. 860879

[51] Int. Cl.[4] ............................ G01L 5/04; G01L 5/16
[52] U.S. Cl. .................................. 73/862.45; 73/862.04
[58] Field of Search ............ 73/862.04, 862.48, 862.54, 73/862.44, 862.45; 254/270, 273

[56] References Cited

U.S. PATENT DOCUMENTS

| | | |
|---|---|---|
| 3,204,454 | 9/1965 | Friman et al. ..................... 73/862.04 |
| 3,802,258 | 4/1974 | Clarke et al. |
| 3,913,396 | 10/1975 | Elliot. |
| 4,102,183 | 7/1978 | Thenander ................... 73/862.45 X |

FOREIGN PATENT DOCUMENTS

| | | |
|---|---|---|
| 1756097 | 3/1970 | Fed. Rep. of Germany ... 73/862.04 |
| 0146096 | 1/1981 | Fed. Rep. of Germany ... 73/862.44 |
| 354120 | 2/1973 | Sweden. |
| 743862 | 1/1956 | United Kingdom. |
| 0891232 | 3/1962 | United Kingdom ............. 73/862.48 |
| 1241776 | 8/1971 | United Kingdom. |

Primary Examiner—Charles A. Ruehl
Attorney, Agent, or Firm—Christie, Parker & Hale

[57] ABSTRACT

This invention relates to a method and to means for determining the internal mechanical stress which is developed within an elongated article which passes from a ship via a wheel into the sea, and for determining the angle relation to vertical at which the article enters the sea. This is obtained by measuring two components of the resulting force acting on the wheel and from these measured components the values of stress and inclination angle are found. Other means such as acceleration compensating equipment, echosounder adapted equipment, paid-out length meter, and the like may be incorporated in the system. Movable mechanical arms are avoided and compensation of different error sources easily may be undertaken.

8 Claims, 3 Drawing Sheets

METHOD AND DEVICE FOR CABLE INSTALLATION

FIELD OF THE INVENTION

The present invention relates to the measurement of the internal longitudinal strain which exists in an elongated article which is passed into the sea via a pay-out or take-up reel on a seaborne vehicle, which reel is fastened to the hull of the vehicle by means of a fastening arrangement; it also relates to the measurement of the inclination angle at which the elongated article leaves or enters the vehicle. More particularly, this invention relates to a device and to a procedure for measuring the mechanical strain in an electric power cable or a flexible pipe which is paid-out from or taken-up by a vessel at deep sea locations, and for measuring of the inclination at which such a cable leaves or enters the vessel.

BACKGROUND OF THE INVENTION

There are earlier known different devices for measuring strain in or the inclination of a cable immediately outboard of a floating vessel. As to the strain measuring equipment, the following references may be mentioned:

U.K. Pat. No. 743,862 which shows a cable holding, braking or winding arrangement comprising two pulleys mounted on a common rotatable carrier;

West German Auslegungschrift No. 21.41.095 (U.S. Pat. No. 3,802,258) which concerns a cable paying out arrangement having resilient members to compensate for sudden strain changes and to indicate the cable strain;

U.K. Pat. No. 1,241,776 which shows a load indicator for mooring lines in which strain gauges are used to detect the strain forces, while the final strain is found by comparing the measured result with an ideal catenary line calculation; and U.K. Pat. No. 1,422,946 (U.S. Pat. No. 3,913,396) also relates to a mooring line system in which the tension in several mooring ropes are measured and compared in a monitoring station which also may give a visual display of the result.

As for devices for measuring the inclination angle, relative to vertical, at which the cable leaves a vessel, no references are mentioned, but all known equipment include large mechanical arms which touch the cable and are guided by it. All of these earlier techniques involve major deficiencies, such as, e.g., being impractical in tough marine environments, being unreliable, being difficult to adjust, and providing measurement which precision is much lower than desired.

A purpose of the present invention is to provide a method according to which either or both of the total cable stress and the inclination angle of the cable is found without use of complicated mechanical arrangements which are sensitive to variable field conditions. A further purpose is to provide methods and arrangements which allow compensation for influences from the accelerations of the ship on the measured values.

SUMMARY OF THE INVENTION

It has long been known in the art and science of marine cablelaying and marine pipelaying that the tension in the cable or pipe being laid on the sea floor, or being retrieved from the sea floor, is to be kept higher proximate the laying vessel than the tension value which is caused by the weight of the cable when the cable is free to assume a natural catenary curve between the vessel and the sea floor. If cable tension forces immediately outboard from the bow or stern guide pulley are allowed to become equal to or less than the natural catenary tension valves, a risk arises that the cable or pipe will bend or coil or kink sharply on itself on the sea floor and thereby become damaged. This risk arises when the cable hangs from the ship in a nearly vertical position. If the cable does sharply coil or kink on itself at the sea floor, expensive repair operations then may be repaired. As is known in the art, the safest way to prevent such damaging kinks is to ensure that the angle at which the cable enters the water from the ship is sufficiently large relative to a plumb reference line. Maintenance of a sufficient entrance angle can be achieved by maintaining appropriate tension on the cable at a level above natural catenary tension levels but below the tension levels which can cause other forms of damage to the cable. To do this, the tension in the cable at the laying vessel needs to be measured. It is not sufficient to merely measure the horizontal and vertical loads on the cable guide wheel because the resultant force angle so determined does not closely correspond to the cable entrance angle (i.e., the true deviation of the cable from a plumb reference line).

This invention provides a simple yet effective way to measure tension values in a marine cable extending from a floating ship at a location in the cable just outboard from the ship. The invention provides improved methods and equipment to achieve this end.

Generally speaking, this invention provides apparatus which is useful in laying or retrieving a relatively inflexible strand-like article, such as a submarine electrical power cable, on or from a sea floor from or to a floating vessel where the article passes from the vessel to the water surface via a guide pulley rotatable in bearings about an axis essentially fixed to the vessel. The article extends from the pulley to the adjacent water surface at an angle relative to a plumb reference line. The apparatus is useful for determining, as desired, the strain in the article between the pulley and the water surface or the value of the angle. The apparatus comprises a signal processor for generating at least one output signal in response to receipt by it of a plurality of input signals. Force measuring means are essentially directly coupled to the pulley axis for measuring in two directions components of the force applied to the pulley by tension in the article on both sides of the pulley and for applying signals representing such force component measurements to the processor as input signals. Bidirectional acceleration measuring means are provided for measuring acceleration of at least one of (a) the vessel in a vertical direction in the vicinity of the pulley, (b) the article along its length toward and away from the pulley, and (c) the pulley angularly about its axis; the acceleration measuring means is operable for applying signals representing such measurements to the processor as input signals. Signal generation and supply means also are provided for generating data signals identifying the efficiency of the pulley bearings and the work required to conform and unconform the article to the pulley in response to motion of the article over the pulley, and for applying the generated data signals to the processor as input signals. The processor is defined to generate, in response to such input signals, at least one output signal representing at least one of the tension in the article outboard of the pulley and the value of the angle.

DESCRIPTION OF THE DRAWINGS

To give a better and more clear understanding of this invention, reference is made to the following detailed description of some embodiments of the invention, and to the accompanying drawings in which.

DESCRIPTION OF THE ILLUSTRATED EMBODIMENTS

Figure 1:
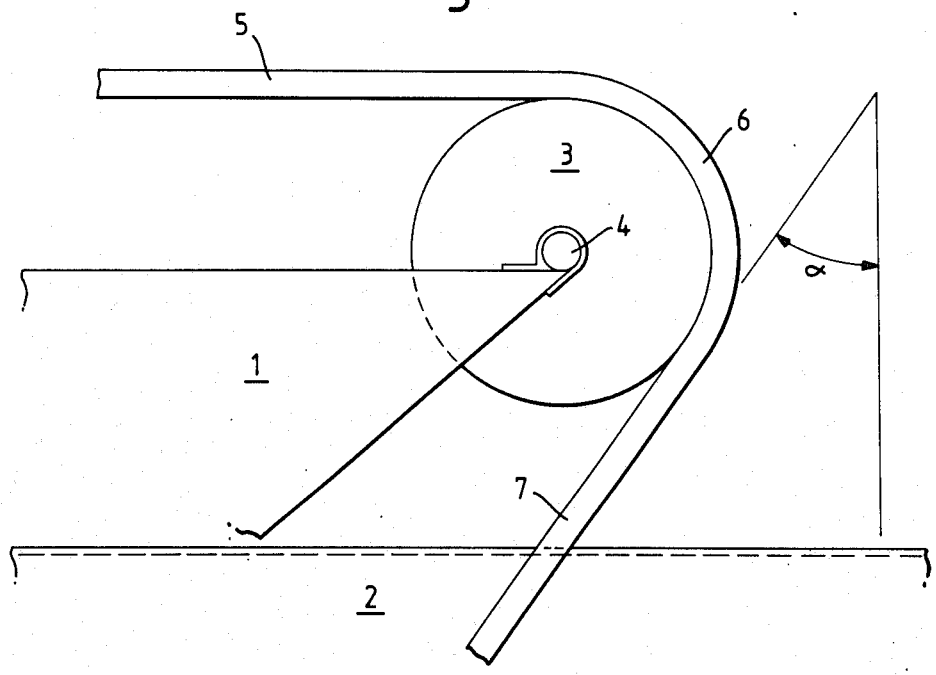
FIG. 1 shows the principle components of a cable pay-out and take-up arrangement on board a vessel.

In FIG. 1, the front of the hull of a cablelaying vessel 1 is shown in elevation. The vessel floats on the sea 2 and has a guiding wheel (pulley 3) fastened by a bearing arrangement 4 in the stem of the ship 1. If desired, wheel 3 could be similarly carried at the stern of the ship. A cable 5, which either is lead to the sea or is brought up from the sea, or even is kept resting in a non-moving position, is bent at 6 over wheel 3 and enters the sea at point 7. In FIG. 1, angle α is the cable inclination angle relative to a plumb reference line. The total weight of the cable may be several thousands of kilograms if deep sea conditions are pertinent. The arrangement shown in FIG. 1 does not show any details such as motors, brakes or other pulleys associated with wheel 3 as they are not elements of this invention and need not be shown or described to enable an understanding of the invention.

Figure 2:
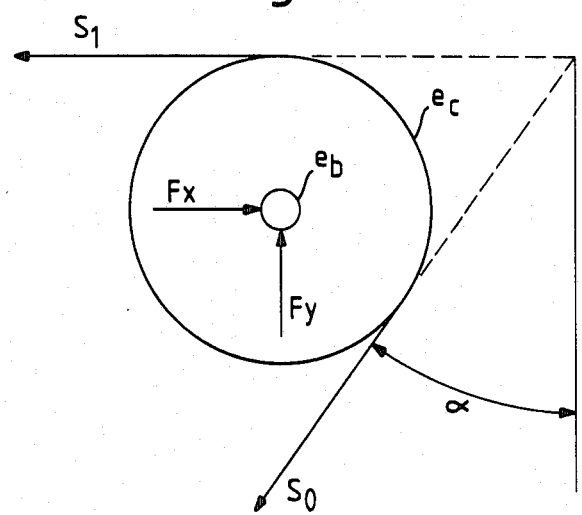
FIG. 2 shows the forces acting on the lay-out and take-up arrangement according to FIG. 1.

In FIG. 2, the forces and the geometry of the wheel and cable are shown in their simplest terms. The forces $S_1$ and $S_0$ represent the tensile stress in the cable itself, at each side of the wheel, respectively. The forces $F_x$ and $F_y$ represent the detected or measured values of the bearing forces in the X and Y directions, respectively. The angle α again is the inclination angle, $e_b$ is the efficiency of the bearing 4 due to frictional losses in the bearing, and $e$ is the efficiency of the cable due to the internal frictional work (a form of loss) which is required to bend the relatively inflexible cable around the wheel 3. These losses are included below in the bearing and cable efficiency values, and the total efficiency $e_{tot}$ is used in the calculations as the product of the above-mentioned individual efficiency values. That is:

$$e_{tot} = (e_b) \cdot (e_c) \quad \text{(eq.: 1)}.$$

If the forces acting on the wheel are considered and are assumed as being in equilibrium, and no acceleration of wheel, cable, or ship takes place, either as the cable is at rest or as the velocity at which it moves over the wheel is constant, the following conditions are obtained:

$$F_x = S_1 + S_0 \cdot \sin\alpha \quad \text{(eq.: 2), and}$$

$$F_y = S_0 \cos\alpha \quad \text{(eq.: 3)}.$$

Figure 3:
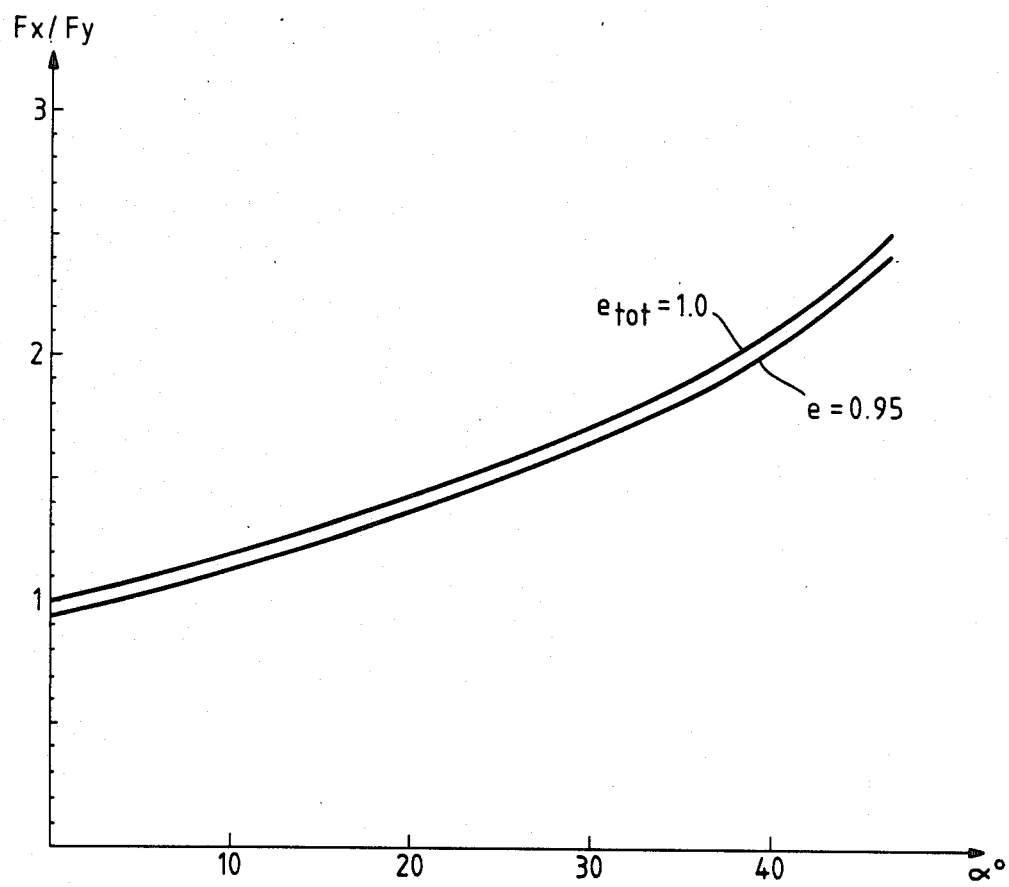
FIG. 3 is a simplified chart showing how the inclination angle α varies with the value of the relation between the components of the bearing force.

When equation 2 is divided by equation 3, a new equation is obtained:

$$(F_x)/(F_y) = \{S_0(e_{tot} + \sin\alpha)\}/\{S_0 \cos\alpha\} = (e_{tot})/(\cos\alpha) + \tan\alpha \quad \text{(eq.: 4)}$$

where $S_1/S_0 = e_{tot}$, which simply means that the difference between $S_1$ and $S_0$ is due to the friction in the wheel bearing and to the cable tension required to bend the cable into or out of conformance to the portion of the wheel rim contacted by the cable. Equation 5 is graphically represented in FIG. 3, and is shown for two different values of the total efficiency in the system, namely $e_{tot} = 1.00$ and $e_{tot} = 0.95$, respectively.

As it will be understood from these equations, there are different methods according to which the desired values of cable tension may be determined depending upon the parameters detected. The most direct method probably is to measure the inclination angle by means of a specific detector, and also to measure the two components $F_x$ and $F_y$ of the resulting bearing force directly, e.g., by means of weighing (load) cells, one for each component. If these values ($F_x$, $F_y$ and α are known, then both the mechanical stress $S_0$ in the cable at the sea level and the exact value of the total efficiency of the system may be calculated from equations 4, and 2, or 3.

A different approach, followed in the practice of this invention, is to measure only the X and Y components of the bearing forces, and to estimate, by empirical methods, a realistic value of the total efficiency deduced from the total losses. In this approach, the value of the inclination angle α is determined from calculations which correspond to the diagram shown in FIG. 3. This will further lead to an easy calculation of $S_0$ by means of equation 2 or 3 above. As the efficiency value $e_c$ is involved in the calculations, the influence from the cable stiffness on the bearing force components is also considered in this rather simple calculation.

The equations set forth above are based on the assumption that stable conditions exist, that is, no accelerations are considered. Of course, this is often far from the truth, especially in marine environments where accelerations are expected in all directions. Any accelerations of the ship, of the cable guide wheel, and of the cable itself will affect the measured bearing force components without affecting the cable stress in a similar manner. However, it is not difficult to take such acceleration forces into account, as they can be detected by means of accelerometers of known types; signals from these acceleration measuring devices may be introduced into the tension measurement system, and errors due to such forces may be compensated for. The most severe error will be caused by acceleration forces due to vertical accelerations of the rather heavy wheel 3, and the effect such forces may have on the measured bearing load component $F_y$. Tension measurement errors due to such vertical accelerations may be compensated by information obtained from a vertical accelerometer 17 arranged close to the wheel 3. The signals from this accelerometer may then be scaled in a proper manner, and added to the signal which represents the measured component $F_y$. Acceleration effects in other directions may be compensated for in a similar manner, but are normally not considered to be so important.

Normally, the desired mechanical stress (tension) values one desires to know are those which really exist in the cable. Much of the intention of the invention is to detect the true stress conditions of the cable to ensure that it should not be overstressed and therefore subjected to damage.

Figure 4:
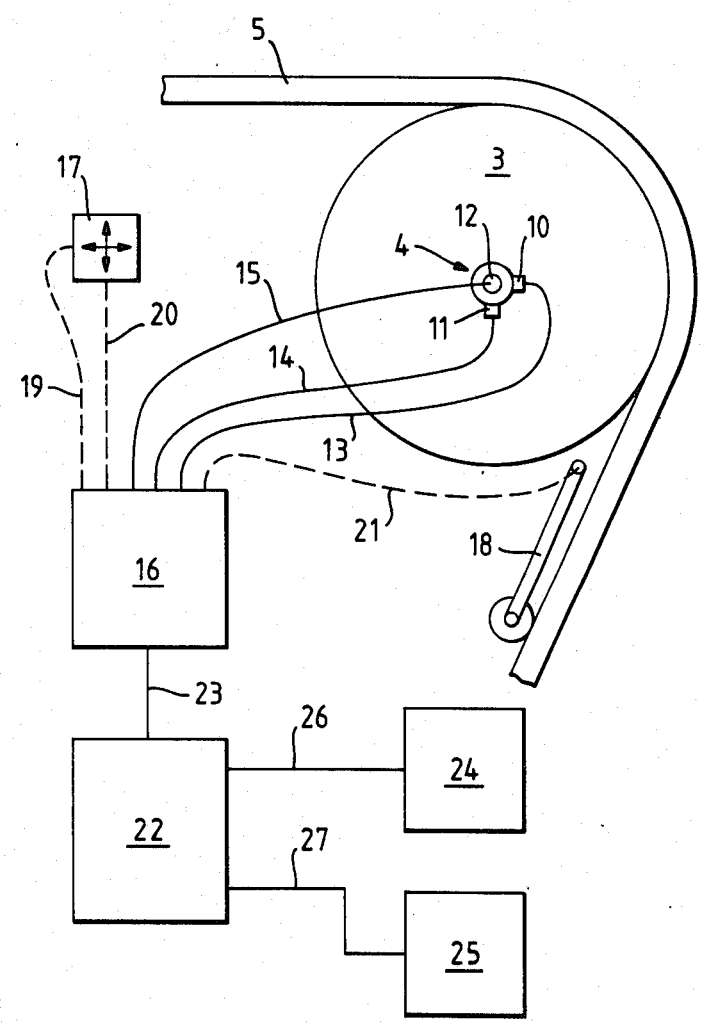
FIG. 4 is a schematic and block diagram of a measurement system according to the invention.

How the relevant acceleration signals may be introduced into the tension measurement system is shown in FIG. 4. In FIG. 4, the cable 5 is bent over the wheel 3, and in addition, there is shown the necessary equipment to obtain the desired values from the detected variables. In FIG. 4, the detectors 10 and 11 are weighing (load) cells or similar detectors, e.g. of the strain gauge type, which continuously measure the orthogonal components of the resulting force which acts on the bearing 4. It is the total force in the bearing which is measured by detectors 10 and 11, including the weight of the wheel 3, the weight of the cable portion which is bearing on the wheel, the effect from the bending of the cable, and all acceleration and retardation forces due to accelerations of the ship itself in all directions, and accelerations of the cable and the wheel including accelerations of rotational character. In addition, a tachometer 12 may be used to determine the angular velocity and acceleration of the wheel 3. This tachometer 12 may be arranged at the center of the wheel, as shown, or it may be arranged at the wheel periphery, or at other workable places on the cable or the cable pulling equipment. The signals provided from the three detectors 10, 11 and 12 are lead to an amplifier 16 via connections 13, 14, and 15, respectively. As explained earlier on, there may also be included at least one accelerometer 17 which detects vessel accelerations in at least one direction, and which forwards signals representing the measured accelerations via connections 19 and 20 to the amplifier 16 mentioned above.

After the various detector signals have been amplified, they are lead to a signal processor 22 via a bus 23. Here the signals are converted to values which are adapted to be represented on the display unit 24 and in a register unit 25 which are coupled to the signal processor 22 via connections 26 and 27. In the measurement system shown in FIG. 4, there is also included an angle detector 18, which is shown as being in mechanical contact with the cable surface, which generates a value for the apparent inclination angle (FIGS. 1 or 2), and which forwards this value to the amplifier 16 via the connector 21. Optional equipment is represented by dotted lines in FIG. 4, which the equipment required to realize the present invention in its simplest form is given in solid lines.

According to the invention, the values of the inclination angle and the cable stress at the surface of the sea are not found directly by measuring the value of the stress and the angle $\alpha$ as such, but are found indirectly by measuring the two different components $F_x$ and $F_y$ of the resulting mechanical force which acts on the bearing of the wheel 3, and ascertaining the desired values from these two readings. If the horizontal and vertical components of the total bearing force are measured, and these components are designated as $F_x$ which is the component of the bearing force in a shiphorizontal direction and $F_y$ which is the vertical component of the bearing force, the desired further values of the inclination angle $\alpha$ and the cable stress $S_0$, respectively, both at sea level, are calculated from the measured force component values, as explained above. The following parameters are involved in an equation needed for a more accurate calculation:

$e_b$ = Efficiency in bearing, about = 0.998
$e_c$ = Efficiency in cable during bending 90°, about 0.99
$S_0$ = Stress in cable at sea level
$S_1$ = Stress in cable beyond (inboard of) the wheel
$w_I$ = Rotational inertia of the wheel
$w_w$ = Rotational angular acceleration of the wheel
$m_w$ = Mass of the wheel
$a_w$ = Acceleration of the wheel
$m_c$ = Mass of cable connected to the wheel
$a_c$ = Acceleration of cable When the acceleration effects are included, the following equation is valid during a pay-out situation:

$$S_0 - S_1 = \text{losses}$$

$$S_0 = (w_I \cdot w_w) + (m_c \cdot a_c) + (m_w \cdot a_w) + [S_1/(e_c \cdot e_b)]\text{-} \qquad \text{Eq. 5;}$$

compare Eq. 4 where $S_1/S_0 = e_{tot} = e_c \cdot e_b$

The relationship between equations 4 and 5 will be apparent. Equation 4 is based upon stable conditions where no accelerations are present, and necessarily defines the relation "$S_1/S_0 = e_{tot}$". Equation 5 is a recasting of this relation in terms of $S_0$ with the addition of the effects on $S_0$ of the forces due to accelerations of the wheel angularly and linearly, and of the cable connected to the wheel. Thus, equation 5 describes a dynamic, rather than a stable, condition.

It is, of course, not required that the bearing force components to be measured be arranged in an orthogonal system of axes. Any measurements done in different directions will make up an unambiguous set of results. However, it is not deemed to be necessary to describe other such methods, as the principle is unaltered while the mathematics become more complex.

As $e_c$ varies with the inclination angle, a minor mistake in the value of the inclination angle may arise, but as this efficiency will not vary considerably for a given arrangement of cable handling equipment, the empirically determined value shall not be far from the correct one. As a matter of fact, it is found by calculation that this influence on the actual angular value shall not exceed 0.3°. Therefore, in a practical solution, it shall normally not be required to take into consideration the variation of the factor $e_c$ with (i.e., as a function of) the inclination angle.

When this method is used in practice, it is only required to build two sensors into the mechanical bearing, and to take the registrations from these detectors to an arithmetic unit, e.g. a microprocessor, which calculates the final values. Thus all types of complicated mechanical equipment are avoided.

A measuring device according to this invention has as a major advantage a very high flexibility. Thus there may be included features which simplify the compensation of different error sources, and there exist a lot of them. E.g., there are the errors due to acceleration of the cable movements, the accelerations in different directions of the ship 1, and of the wheel 3, and variations in the values of the losses which may occur during the lay-out or take-up procedure. As an example, it may be mentioned that the frictional losses in the cable itself not only vary with the cable type, but also with the lay-out angle, as the lay-out angle determines the degree of bending of the cable, and the greater the bending, the greater the bending losses.

It should also be mentioned that very good results have been obtained in experimental equipment by measuring only the values of the $F_x$ and the $F_y$ components of the resulting bearing force combined with an adjustment of the total efficiency $e_{tot}$ of the system in between the values 0.95 and 1.0. The calculated values of $S_0$ and of the inclination angle have then been found to be very close to the real values, i.e. within a ±1.0% limit.

The above description pertains to only a preferred embodiment of the invention. The arrangements and procedures of the invention may be varied within the scope of the invention as stated in the claims below. As modificatons of the invention, the following features may be mentioned. The register unit 25 (FIG. 4) may be implemented by a printer which automatically delivers a printout of strain, angle of inclination, and length of cable paid out, at regular, but adjustable intervals, e.g. each 10 second, or each half minute. If the ship is provided with an echosounder, the measuring arrangement according to the invention may be adapted to this echosounder so that water depth also is registered at regular intervals. It should also be considered that the measured values may be smoothed so that average values, rather than instantaneous values, are obtained for each interval. Such smoothing can easily be obtained by means of known electronic filtering of the signals representing the measured values or the calculated functions.

I claim:

1. Apparatus, useful in the laying and retrieving of a relatively inflexible strand-like article respectively on and from a sea floor respectively from and to a floating vessel via a guide pulley rotatable in bearings about an axis essentially fixed to the vessel and from which the article extends to the adjacent water surface at an angle relative to a plumb reference line, for determining, as desired, the strain in the article between the pulley and the water surface or the value of the angle, the apparatus comprising:
    (A) a signal processor for generating at least one output signal in response to receipt by the processor of a plurality of input signals;
    (B) force measuring means essentially directly coupled to the pulley axis for measuring in two directions components of force applied to the pulley by tension in the article on both sides of the pulley and means for applying signals representing such force component measurements to the processor as input signals;
    (C) bidirectional acceleration measuring means for measuring accelerations of at least one of (a) the vessel in a vertical direction in the vicinity of the pulley, (b) the movement of the strand-like article toward and away from the pulley along its length, and (c) the pulley angularly about its axis and for applying signals representing such acceleration measurements to the processor as input signals;
    (D) signal generation and supply means
        (1) for generating data signals identifying the efficiency of the pulley bearings and the work required to conform and unconform the article to the pulley in response to motion of the article over the pulley, and
        (2) for supplying said generated data signals to the processor as input signals;
    (E) the processor being defined to generate, in response to said input signals, the at least one output signal representing respectively at least one of (a) the tension in the article outboard of the pulley and (b) the value of said angle.

2. Apparatus according to claim 1 wherein the force measuring means is operative for measuring in orthogonal directions components of force applied to the pulley by tension in the article.

3. Apparatus according to claim 1 wherein said two directions of force component measurement are substantially in the plane of the pulley.

4. Apparatus according to claim 1 wherein the signal generation and supply means is operative for generating data signals identifying at least one of (a) the pulley mass (b) the angular inertia of the pulley, and (c) the mass of that portion of the article conforming to the pulley.

5. Apparatus according to claim 4 wherein the signal generating and supply means is operative for generating data signals identifyng the pulley mass, the pulley angular inertia, and the mass of the portion of the article conforming to the pulley.

6. Apparatus according to claim 1 wherein the bidirectional acceleration measuring means is operative for separately measuring all of said accelerations and for applying separate signals representing said measurements to the processor as input signals.

7. Apparatus according to claim 6 wherein the signal generating and supply means is operative for generating separate data signals identifying the pulley mass, the pulley angular inertia, and the mass of the portion of the article conforming to the pulley and for supplying said data signals to the processor as input signals, and the apparatus is useful for determining the strain in the article between the pulley and the water surface and the value of the angle.

8. A method for measuring the longitudinal stress in an elongated relatively inflexible article which passes into the sea from a floating vessel via guide pulley, or the angle of the article between the pulley and the sea surface to indirectly ascertain such longitudinal stress with other information, comprising the steps of
    (A) measuring
        (1) in two selected directions the components of force applied to the pulley by tension in the article on both sides of the pulley,
        (2) at least one of the following bidirectional accelerations:
            a. the vessel in a vertical direction in the vicinity of the pulley,
            b. the article toward and away for the pulley along its length, and
            c. the pulley angularly about an axis of rotation thereof,
    (B) identifying
        (1) the efficiency of bearings for the pulley and,
        (2) the work required to conform the nonconform the article to the pulley as the article moves over the pulley, and
    (C) evaluating the measurements and the identifications according to a selected relation of the same to the longitudinal stress or to the angle to obtain a stress or angle value.

* * * * *

UNITED STATES PATENT AND TRADEMARK OFFICE
CERTIFICATE OF CORRECTION

PATENT NO. : 4,776,221

DATED : October 11, 1988

INVENTOR(S) : Brigt L. Friis

It is certified that error appears in the above-identified patent and that said Letters Patent is hereby corrected as shown below:

Column 3, line 24, change "is lead" to -- leads --.
Column 3, line 44, change "eis" to -- $e_c$ is --.

Column 5, line 21, change "are lead" to -- lead --.
Column 5, line 29, change "are lead" to -- lead --.
Column 5, line 40, change "which" to -- while --.

Column 7, line 3, change "modificatons" to
    -- modifications --.

Column 8, line 53, before "nonconform" delete "the" and
    insert therefor -- and --.

Signed and Sealed this

Ninth Day of May, 1989

Attest:

DONALD J. QUIGG

*Attesting Officer*    *Commissioner of Patents and Trademarks*